US009172110B2

United States Patent
Wang et al.

(10) Patent No.: US 9,172,110 B2
(45) Date of Patent: Oct. 27, 2015

(54) SOLID ELECTROLYTE AND LITHIUM BASED BATTERY USING THE SAME

(71) Applicants: Li Wang, Beijing (CN); Xiang-Ming He, Beijing (CN); Jian-Jun Li, Beijing (CN); Jian Gao, Beijing (CN); Chang-Yin Jiang, Beijing (CN)

(72) Inventors: Li Wang, Beijing (CN); Xiang-Ming He, Beijing (CN); Jian-Jun Li, Beijing (CN); Jian Gao, Beijing (CN); Chang-Yin Jiang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 408 days.

(21) Appl. No.: 13/652,813

(22) Filed: Oct. 16, 2012

(65) Prior Publication Data

US 2013/0157144 A1 Jun. 20, 2013

(30) Foreign Application Priority Data

Dec. 17, 2011 (CN) .......................... 2011 1 0423660

(51) Int. Cl.
*H01M 10/0525* (2010.01)
*H01M 10/0565* (2010.01)
*H01M 10/42* (2006.01)

(52) U.S. Cl.
CPC ...... *H01M 10/0525* (2013.01); *H01M 10/0565* (2013.01); *H01M 10/4235* (2013.01); *H01M 2300/0082* (2013.01); *H01M 2300/0091* (2013.01); *Y02E 60/122* (2013.01)

(58) Field of Classification Search
CPC .............. H01M 2300/0082; H01M 2300/0091
See application file for complete search history.

(56) References Cited

U.S. PATENT DOCUMENTS 5,609,974 A * 3/1997 Sun .............................. 429/317
2010/0162892 A1 7/2010 Kase et al.

FOREIGN PATENT DOCUMENTS

CN 101754798 6/2010

OTHER PUBLICATIONS

Anette Munch Elmer, etal. "Solid electrolyte membranes from semi-interpenetrating polymer networks of PEG-grafted polymethacrylates and poly(methyl methacrylate)", Solid State Ionics. vol. 177, pp. 573-579, 2006.

* cited by examiner

*Primary Examiner* — Kuo-Liang Peng
(74) *Attorney, Agent, or Firm* — Novak Druce Connolly Bove + Quigg LLP

(57) ABSTRACT

A solid electrolyte includes an interpenetrating polymer network, a plasticizer and a lithium salt. The plasticizer and the lithium salt are dispersed in the interpenetrating polymer network. The interpenetrating polymer network includes $-(CH_2-CH_2-O-)_n$ segments, and is formed by polymerizing a first monomer $R_1-O-(CH_2-CH_2-O-)_nR_2$ with a second monomer $R_3-O-(CH_2-CH_2-O-)_mR_4$ under an initiator. The "$R_1$", "$R_2$" or "$R_3$" respectively includes $-C=C-$ group or $-C\equiv C-$ group. The "$R_4$" includes an alkyl group or a hydrogen atom. The "m" and "n" are integers. A molecular weight of the first monomer or a molecular weight of the second monomer is greater than or equal to 100, and less than or equal to 800. The first monomer is less than or equal to 50% of the second monomer by weight. The lithium salt is less than or equal to 10% the second monomer by weight. A lithium based battery using the solid electrolyte is also provided.

18 Claims, 6 Drawing Sheets

SOLID ELECTROLYTE AND LITHIUM BASED BATTERY USING THE SAME

RELATED APPLICATIONS

This application claims all benefits accruing under 35 U.S.C. §119 from China Patent Application No. 201110423660.7, filed on Dec. 17, 2011 in the China Intellectual Property Office, the disclosure of which is incorporated herein by reference. This application is related to applications entitled "SOLID ELECTROLYTE AND LITHIUM BASED BATTERY USING THE SAME", having application Ser. No. 13/652,807; "METHOD FOR MAKING SOLID ELECTROLYTE", having application Ser. No. 13/652,824; and "INTERPENETRATING POLYMER NETWORK AND METHOD FOR MAKING THE SAME", having application Ser. No. 13/653,607.

BACKGROUND

1. Technical Field

The present disclosure relates to a solid polymer electrolyte (SPE) and a lithium based battery using the SPE.

2. Discussion of Related Art

Electrolytes are important components in lithium based batteries. Solid electrolytes, especially solid polymer electrolytes, are non-volatile, non-explosive, flexible, and electrochemically stable. The polymers with $-(CH_2-CH_2-O)_n-$ segments are compatible with general lithium salts and can be used as solid electrolyte matrixes. However, the polymers with $-(CH_2-CH_2-O)_n-$ segments have high crystallization degrees, which make the solid electrolytes using the polymers to have low ion conductivities and low thermal stabilities. Thus the lithium based batteries employing the solid electrolytes have short life spans.

What is needed, therefore, is to provide a solid polymer electrolyte including $-(CH_2-CH_2-O)_n-$ segments, and a lithium based battery using the same, to overcome the above-mentioned shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
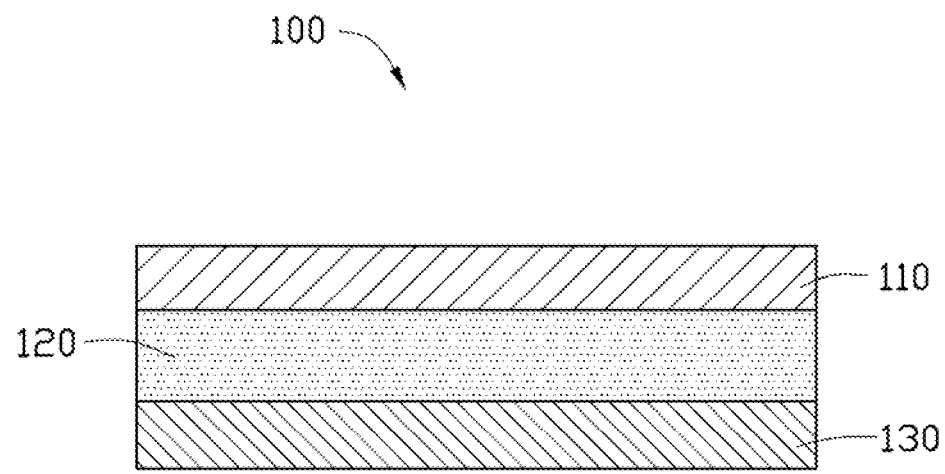
FIG. 1 is a schematic view of a lithium based battery of one embodiment.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An SPE of one embodiment includes an IPN, a lithium salt and a plasticizer. The lithium salt and the plasticizer are dispersed in the IPN. The IPN includes $-(CH_2-CH_2-O)_n-$ segments, and is formed by polymerizing a first monomer $R_1-O-(CH_2-CH_2-O)_n-R_2$ with a second monomer $R_3-O-(CH_2-CH_2-O)_n-R_4$ under an initiator. Wherein each "$R_1$", "$R_2$" and "$R_3$" includes an unsaturated group with $-C=C-$ group or $-C\equiv C-$ group. "$R_4$" is an alkyl group or a hydrogen (H). The alkyl group can be methyl ($-CH_3$), ethyl ($-CH_2-CH_3$), or propyl ($-CH_2-CH_2-CH_3$ or $-CH-(CH_3)_2$). "m" and "n" each represents an integer number.

The IPN is a matrix of the SPE, and mainly used to load the lithium salt and the plasticizer. A molecular structure of the IPN can be a linear and open-loop structure. In one embodiment, the molecular structure of the IPN is substantially a branch structure, like a tree. The "$R_1$" and "$R_2$" of the first monomer and "$R_3$" of the second monomer each can include unsaturated chain hydrocarbon groups or unsaturated chain hydrocarbon groups with carbonyl, such as, ethenyl ($-CH=CH_2$), ethynyl ($-C\equiv CH$), allyl ($-CH=CH-CH_3$, or $-(CH_3)C=CH_2$), propinyl ($-C\equiv C-CH_3$), or ethenyl ketonic group

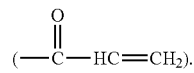

The "$R_1$", "$R_2$" and "$R_3$" in a same IPN can be the same groups or different groups.

Molecular weights of the first and second monomers can be respectively greater than or equal to 100, and less than or equal to 800. In one embodiment, the molecular weights of the first and second monomers can be respectively greater than or equal to 200, and less than or equal to 600. The first monomer is less than or equal to 50% of the second monomer by weight. In one embodiment, the first monomer is less than or equal to 20% of the second monomer by weight.

The initiator makes the first and second monomers form free radicals and polymerize into the IPN. The initiator can be a thermo-initiator or a photo-initiator. The thermo-initiator can be chloride gas, bromine gas, organic peroxide, or azo initiator. The photo-initiator can be 1-hydroxy-cyclohexyl phenyl ketone (HCPK), 2-methyl-1-[4-(methylthio)-phenyl]-2-morpholino-propiopheno (MMMP), or dimethylol propionic acid (DMPA).

In one embodiment, the IPN is formed by polyethyleneglycol (200) dimethacrylate (PEG200diA), PEG350mA and 0.1% DMPA by weight. Wherein, "200" in PEG200diA represents a molecular weight of the PEG group is about 200.

The IPN can be made by the following steps:

S10, providing the first monomer, the second monomer and the initiator;

S20, mixing the first monomer, the second monomer and the initiator to form a mixture, wherein the weight ratio of the first monomer to the second monomer is less than or equal to 50%; and S30, polymerizing the first monomer with the second monomer to form the IPN.

In step S10, the initiator is selected by the pre-polymerizing groups of the first and second monomers. The initiator can vary from the first and second monomers.

Step S20 can include: firstly, mixing the first and second monomers; next, adding the initiator to form the mixture; and then agitating the mixture. The added content of the initiator is less than 1% of the second monomer by weight.

If the initiator is the photo-initiator, step S30 can include the sub-steps of: putting the mixture into a protective gas; using a UV light to irradiate the mixture to substantially polymerize the first monomer with the second monomer under the photo-initiator to form the IPN; and heating the IPN to obtain a dried IPN. The protective gas can be an inert gas, such as nitrogen gas, helium gas, neon gas, argon gas, krypton gas or xenon gas. An irradiating period of UV light is in a range from about 30 minutes to about 2 hours. In one embodiment, the irradiating period ranges from about 45 minutes to about 1.5 hours. The irradiating period can be determined by the weights and types of the first and second monomers. A wave length of the UV light can be about 365 nanometers. The IPN is heated to a first temperature for a first heating period, to remove the solvent used in the process of forming the IPN, and the first temperature ranges from about 50 Celsius degrees to about 100 Celsius degrees. In one embodiment, the first temperature is in a range from about 60 Celsius degrees to about 90 Celsius degrees. The first heating period ranges from about 5 hours to about 24 hours. In one embodiment, the first heating period is in a range from about 7 hours to about 12 hours.

When the initiator is the thermo-initiator, the step S30 is mainly made by a thermal polymerization method. The method can include the following sub-steps of: putting the mixture into the protective gas; and heating the mixture to a second temperature for a second heating period, to substantially polymerize the first monomer with the second monomer under the thermo-initiator to form the IPN. The second temperature in the thermo-polymerizing process can be less than 80 Celsius degrees. In one embodiment, the second temperature is greater than 40 Celsius degrees, and less than 70 Celsius degrees. The second heating period ranges from about 5 hours to about 24 hours. In one embodiment, the second heating period is in a range from about 1 hour to about 12 hours, such as 2 hours, 8 hours. The second temperature and the second heating period can be determined by the amounts and types of the first and second monomers.

In one embodiment, the first monomer is polyethyleneglycol dimethacrylate (PEGdiA), and the second monomer is methoxy polyethylene glycol monoacrylate (PEGmA). That is to say, the IPN is mainly formed by polymerizing PEGdiA and PEGmA. Specifically, a method for making the IPN can include the following steps: providing PEGdiA, PEGmA, and the initiator; mixing PEGdiA, PEGmA, and the initiator to form a mixture, and PEGdiA is less than 50% of PEGmA by weight; and then putting the mixture into the protective gas; and irradiating the mixture by UV light or heating the mixture to substantially polymerize the PEGdiA with PEGmA under the initiator, thereby forming the IPN.

The lithium salt is substantially used to conduct ions. The lithium salt is uniformly dispersed in the IPN, and mainly in solid solution. The lithium salt can be $LiClO_4$, lithium hexafluoro-phosphate ($LiPF_6$), lithium tetrafluoro-borate ($LiBF_4$), or lithium bis(oxalate)-borate ($Li_2C_2O_4$). The lithium salt also can be an anode active material or a cathode active material, such as lithium manganate ($LiMn_2O_4$), lithium iron phosphate ($LiFePO_4$), lithium nickelate ($LiNiO_2$), or lithium cobalt oxide ($LiCoO_2$). In the SPE, the lithium slat is less than or equal to 10% of the second monomer by weight.

The plasticizer can be a multi-arm star macromolecule material, such as, a four-arm star macromolecule material, or a six-arm star macromolecule (SM) material. The multi-arm star macromolecule material is uniformly dispersed in the IPN, and can prevent the IPN from being crystallized. The cross linking degree and crystallization of the IPN can be decreased, and the mobility of the branched chains of the IPN can be improved. Therefore, an ionic conductivity of the SPE can be improved. The SPE can also have a high ionic conductivity under a room temperature.

In one embodiment, the plasticizer is an SM material synthesized from phloroglucinol, phosphorus oxychloride ($POCl_3$) and methyl polyethylene glycol (MPEG). The reaction equation is shown as the following chemical reaction equations (1):

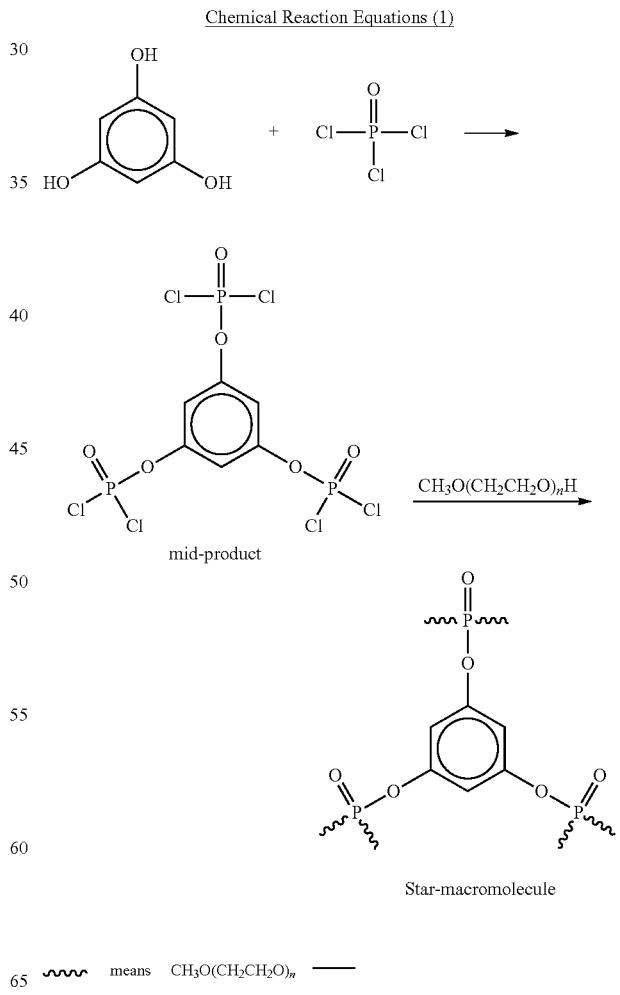

A molecular weight of the SM can be about 120, 400, 600 or 750. In one embodiment, the molecular weight of the SM is about 400, which can be labeled as SM400. The SM includes phosphate groups, which can act as flame retardant. As such, the SM also can act as a flame retardant to prevent the SPE from being burned. The thermal stability of the SPE can be improved.

The IPN matrix has a low crystallization degree such that the ionic conductivity of the SPE is high. The IPN matrix includes $-(CH_2-CH_2-O)_n$ segments, the O atoms in the $-(CH_2-CH_2-O)_n$ segments combines with $Li^+$. In addition, the multi-arm star macromolecule material can be conducive to decrease the crosslinking and crystallization degrees of the IPN, and improving the mobility of the branched chains of the IPN. Therefore, the SPE can have a high ionic conductivity, even if $LiClO_4$ is low in content, or the SPE is used at room temperature. In addition, branched chains of the IPN matrix have low degrees of crystallization, which causes the IPN matrix to have a high glass transition temperature ($T_g$). The IPN has good thermal stability and electro-chemical stability. Therefore, the SPE using the IPN also has good thermal stability and electro-chemical stability. Because the SPE is excellent in high ionic conductivity, thermal stability and electro-chemical stability, the lithium based battery using the SPE has long life span, high power, good stability, and safety. For example, the SPE including SM400 plasticizer and the IPN polymerized by the PEG200diA and PEG350mA can be completely decomposed at a temperature of higher than 250 Celsius degrees.

A method for making the SPE is similar to the method for making the IPN, except that the lithium salt and the multi-arm macromolecule material as the plasticizer are added in the IPN making process. Specifically, the lithium salt and the multi-arm macromolecular material are provided in the step S10. The step S20 further includes sub-steps of: mixing the lithium slat and the multi-arm macromolecular material with the first monomer, the second monomer and the initiator, to obtain an intermediate mixture; and pouring the intermediate mixture onto a plate-shaped container. Then the intermediate mixture is treated by the step S30, whereby the free-standing SPE is formed. In one embodiment, the plate-shaped container is Teflon plate.

One embodiment of a lithium based battery using the SPE is also provided. The lithium based battery includes an anode, a cathode, the SPE, and an encapsulated structure. The anode, the cathode and the SPE are sealed in the encapsulated structure. The anode, the SPE and the cathode are respectively in sheet shaped. The anode, the SPE and the cathode are overlapped in order.

Structures of the anode and the cathode are varied according to the type of the lithium based battery. If the lithium based battery is a lithium metal battery, the material of the anode can be manganese dioxide ($MnO_2$), ferrous sulfide (FeS), sulfur dioxide ($SO_2$), thionyl chloride ($SOCl_2$), pure lithium, or lithium alloy, the material of the cathode can be pure lithium, or lithium alloy. When both the anode and cathode are made of pure lithium, or lithium alloy, the lithium metal battery can be a secondary battery.

The lithium based battery also can be a lithium ion battery. The anode includes a sheet-shaped anode collector and an anode material layer located and/or formed on the anode collector. The cathode includes a sheet-shaped cathode collector, and a cathode material layer located and/or formed on the cathode collector. Both the cathode material layer and the anode material layer are attached to the SPE. A thickness of the anode can range from about 100 micrometers to about 300 micrometers. In one embodiment, the thickness of the anode is about 200 micrometers. A thickness of the cathode can range from about 50 micrometers to about 200 micrometers. In one embodiment, the thickness of the cathode is about 100 micrometers.

The anode collector and the cathode collector can be metals. Specifically, the anode collector can be aluminum foil, or titanium foil. The cathode collector can be copper foil or nickel foil. A thickness of the anode collector and a thickness of the cathode collector can respectively range from about 1 micrometer to about 200 micrometers. The anode material layer includes an anode active material, with a conductive additive, and an adhesive additive uniformly mixed together. The cathode material layer includes a cathode active material, the conductive additive and the adhesive additive uniformly mixed with each other. The anode active material can be $LiMn_2O_4$, $LiFePO_4$, $LiNiO_2$, or $LiCoO_2$. The cathode active material can be natural graphite, cracking organic carbon, or mesocarbon microbeads (MCMB). The conductive additive can be graphite, acetylene black, carbon nanotube, or any combination thereof. The adhesive additive can be poly(vinylidene fluoride) (PVDF), poly(tetrafluoroethylene) (PTFE), styrene-butadiene rubber (SBR) or any combination thereof. It is noted that the anode active material, the cathode material, the conductive additive, and the adhesive additive, can be other conventional materials used in the lithium based batteries.

Example

Referring to FIG. 1, one embodiment of a lithium based battery 100 is provided. The lithium based battery 100 is a lithium metal battery, includes a lithium sheet-shaped anode 110, an SM400-IPN-$LiClO_4$SPE 120 and a lithium sheet-shaped cathode 130. The IPN-$LiClO_4$ SPE 120 is composed of SM400, IPN matrix and $LiClO_4$. Both SM400 and $LiClO_4$ are dispersed in the IPN matrix. The IPN matrix is formed by PEG350 mA, PEG200diA and DMPA by UV—in situ polymerization process. The polymerization reaction equation is shown as the following chemical reaction equation (2):

Chemical Reaction Equation (2)

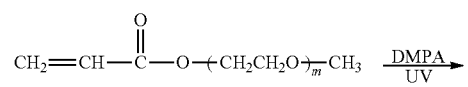

-continued

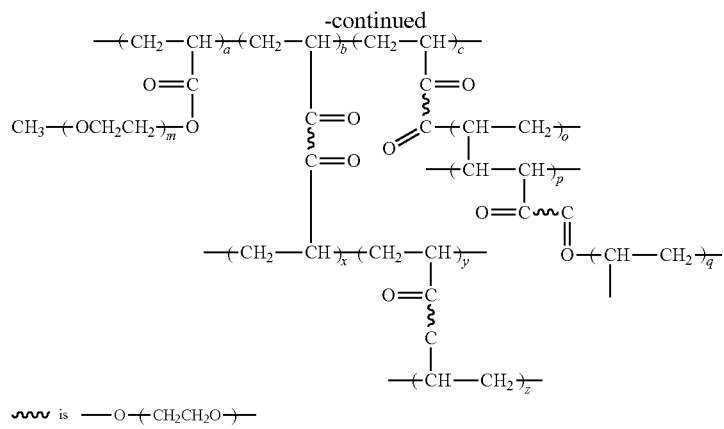

is —O—(CH₂CH₂O—)—

Wherein all of the subscripts a, b, c, x, y, z, o, p, and q are integers.

Specifically, the SM-IPN-LiClO₄ SPE 120 can be made by the following steps:

providing SM400, wherein SM400 can be prepared by dropping phloroglucionl-acetonitrile solution into POCl₃ to form a primary mixture; stirring the primary mixture to obtain an intermediate solution; dissolving MPEG-400 into acetonitrile to form an MPEG-400 acetonitrile solution, and then adding the MPEG-400 acetonitrile solution into the intermediate solution; and removing evaporated solution after about 48 hours, thereby obtaining SM400;

mixing PEG350mA, PEG200diA, DMPA, SM400 with LiClO₄ to form an intermediate mixture, wherein PEG350mA is about 2.5% of PEG200diA by weight, DMPA is about 0.1% of PEG350mA by weight, and LiClO₄ is less than or equal to 10% of PEG350mA by weight; and putting the intermediate mixture onto a Teflon plate in nitrogen gas; and using UV light with a wavelength of about 365 nanometers to irradiate the mixture for about 60 minutes to substantially polymerize PEG350mA with PEG200diA to form the IPN, thereby obtaining a final mixture including the IPN, LiClO₄ and SM400; and drying the final mixture for about 8 hours at a temperature about 80 Celsius degrees, thereby forming the SM-IPN-LiClO₄SPE 120.

Wherein, contents of the raw materials for making the SM-IPN-LiClO₄ SPE 120 affect properties of the SM-IPN-LiClO₄ SPE 120. Details are shown as follow:

(1) Compatibility of Ingredients in the SM400-IPN-LiClO₄ SPE 120

Figure 2:
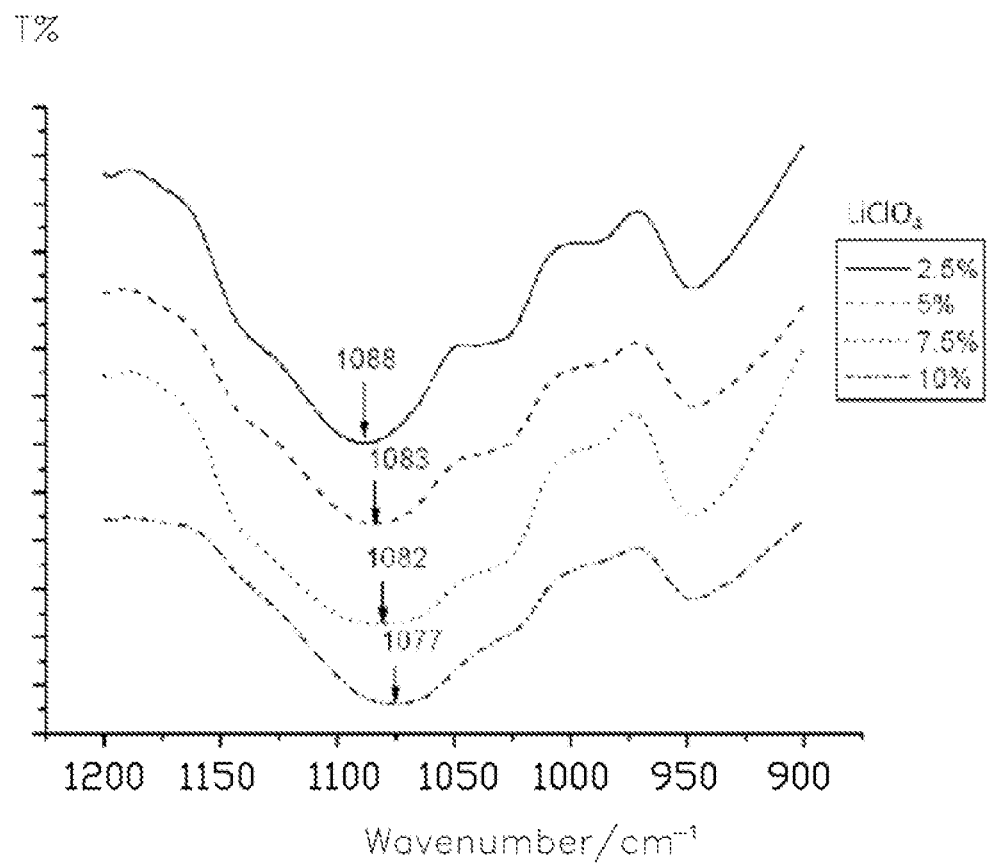
FIG. 2 shows Fourier transform infrared spectroscopy (FTIR) spectra of six-arm macromolecule (400)—interpenetrating polymer network—lithium perchlorate (SM400-IPN-LiClO$_4$) SPEs, wherein LiClO$_4$ has different weight percents with methoxy polyethylene glycol (350) monoacrylate (PEG350mA) for making the interpenetrating polymer network (IPN), wherein "400" in SM400 represents a molecular weight of the six-arm macromolecule (SM) is about 400, and "350" in PEG350mA represents a molecular weight of the PEG group is about 350.

Referring to FIG. 2, there is a characteristic peak at 1088 $cm^{-1}$ caused by the stretching vibration of the functional group C—O—C. As such, the compatibility between LiClO₄ and SM400-IPN can be evaluated in view of the stretching vibration of the functional group C—O—C. In FIG. 2, the characteristic peak position shifts from 1088 $cm^{-1}$ to 1077 $cm^{-1}$ with the increase of LiClO₄ content, which shows that the functional group C—O—C has a strong effect on $Li^+$. It can be explained as follows. The electronic cloud focuses on the O atom in the functional group C—O—C, the O atom displays negativity. If LiClO₄ is dispersed in IPN, $Li^+$ will be bound with the O atom. The density of the electronic cloud focused on the O atom will be decreased. Therefore, the interaction between the O atom in the functional group C—O—C and $Li^+$ will get weak with the increase of LiClO₄ content. A blue shift of an infrared characteristic peak position of the functional group C—O—C will happen.

In addition, SM400 has tiny effect on the interactions between the functional group C—O—C and $Li^+$. The strong interaction between the functional group C—O—C and $Li^+$ indicates a good compatibility among IPN matrix, SM400 material plasticizer and lithium salt.

(2) Thermal Property of the SM400-IPN-LiClO₄ SPE 120

Figure 3:
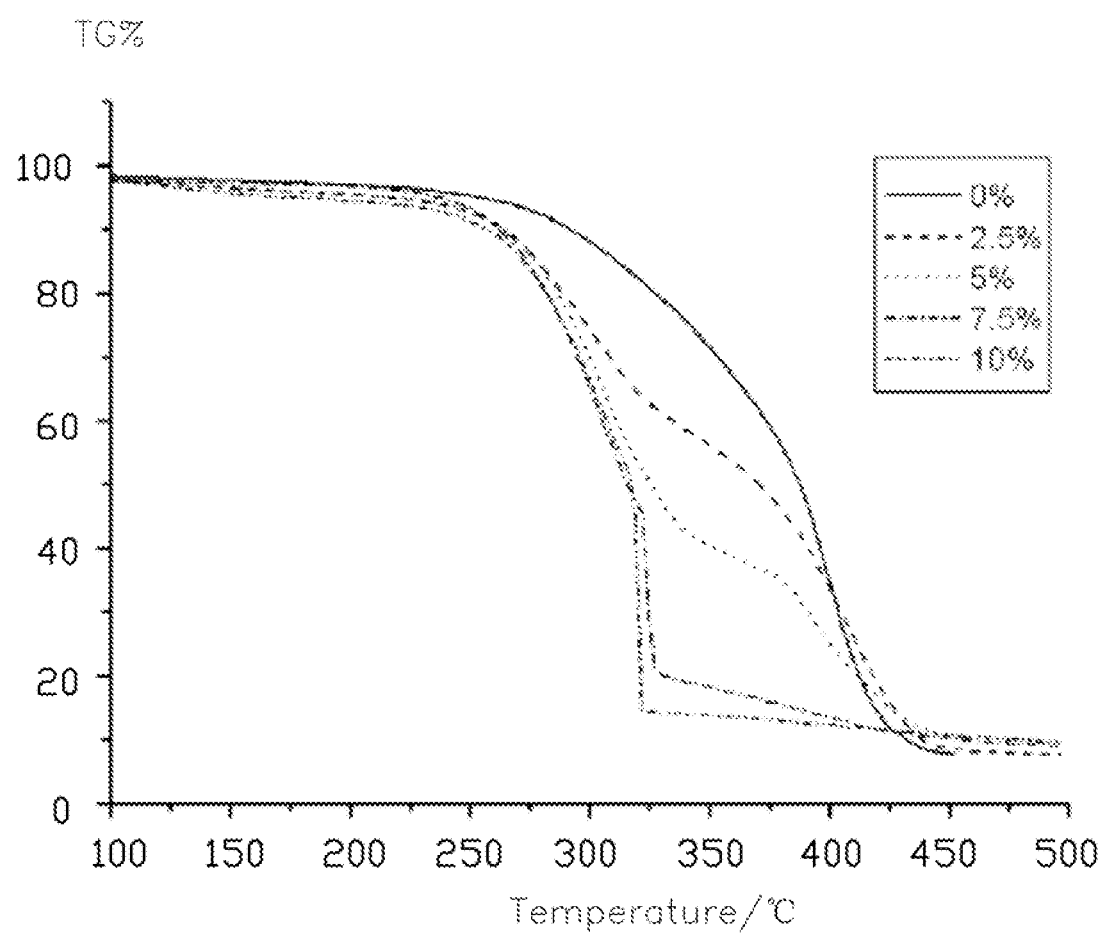
FIG. 3 shows thermo-gravimetric (TG) curves of SM400-IPN-LiClO$_4$ SPEs, wherein LiClO$_4$ has different weight percents of PEG350mA.

Referring to FIG. 3, "TG %" represents that a weight content of the SM400-IPN-LiClO₄SPE at a certain temperature with the original weight of the SM400-IPN-LiClO₄SPE. FIG. 3 shows that: the SM400-IPN-LiClO₄SPEs display two-stage degradation. The first stage degradation starts at about 250 Celsius degrees and finishes at about 350 Celsius degrees. In the second stage degradation, the degrading speed is increased with the increase of LiClO₄ content. SM400 can be decomposed at a temperature ranged from about 220 Celsius degrees to 320 Celsius degrees. The first stage degradation can mainly be attributed to the decomposing of SM400, and the second stage degradation can be caused by the IPN matrix decomposed under the oxidation of LiClO₄. Therefore, the completely decomposed temperature of the SM400-IPN-LiClO₄ SPE can be decreased as the increase of SM400 content. The SM400-IPN-LiClO₄SPE still can be completely decomposed at a temperature higher than 250 Celsius degrees. Thus, the thermal stability of the SM400-IPN-LiClO₄SPE is good and not easy to decompose at a normal working period. The SM400 includes phosphate groups, which can function as flame retardant. The SM400-IPN-LiClO₄SPE can be safe for applicable in lithium based batteries.

(3) Ionic Conductivities of the SM400-IPN-LiClO₄SPEs

Figure 4:
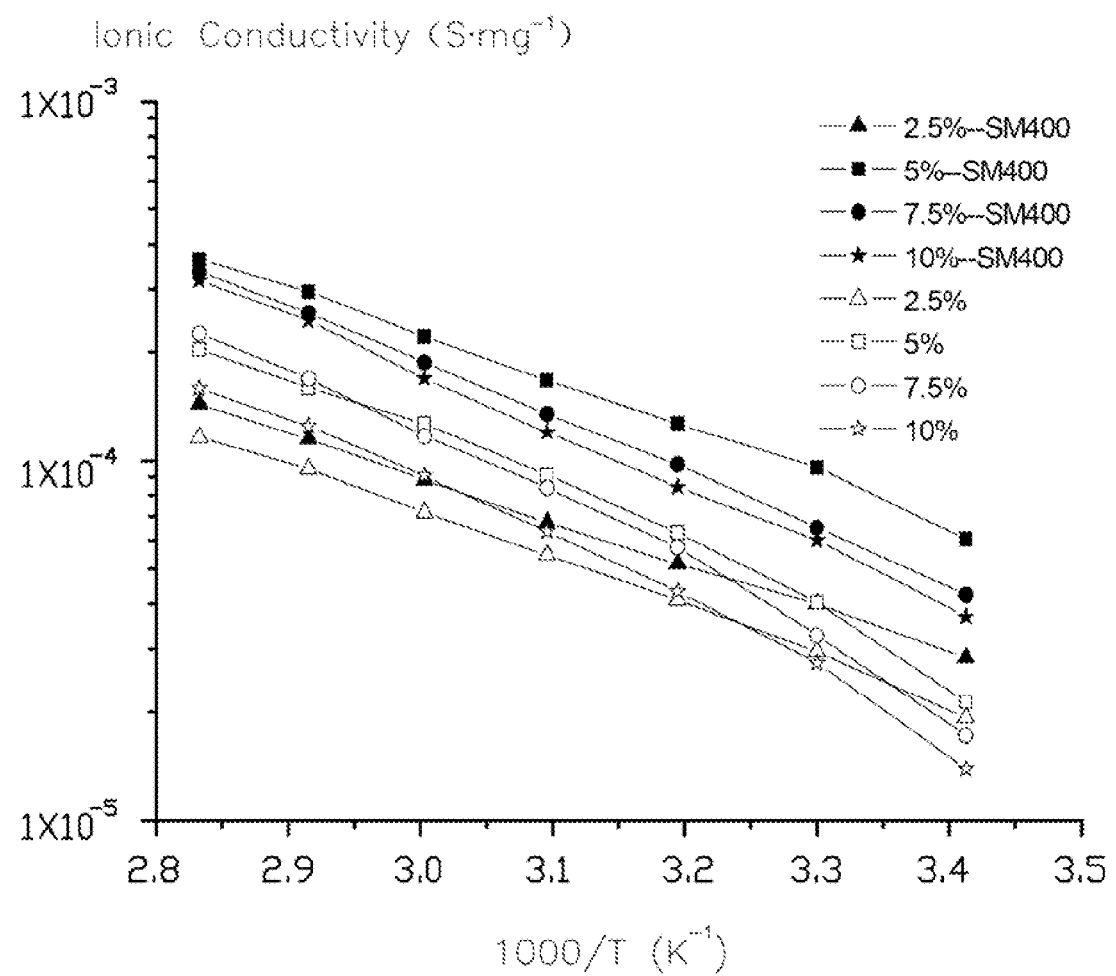
FIG. 4 shows ion conductivity curves of SM400-IPN-LiClO$_4$SPEs and IPN-LiClO$_4$, wherein LiClO$_4$ has different weight percents of PEG350mA.

Referring to FIG. 4, "T" in the "1000/T" stands for a real Kelvin temperature of the IPNs-LiClO₄SPE, thus "1000/T" is a ratio of 1000 Kelvin (K) to the real Kelvin temperature. In FIG. 4, marginal data of "2.5%—SM400", "5%—SM400", "7.5%—SM400" and "10%—SM400" all represent that the SPEs includes SM400. LiClO₄ is respectively about 2.5%, 5%, 7.5% and 10% of PEG350mA by weight. The marginal data without "SM400" represent that the SPEs are IPN-LiClO₄SPEs including no SM400.

The ionic conductivities of the SM400-IPN-LiClO₄SPEs decrease as the "1000/T" increase. Thus, the ionic conductivities of the SM400-IPN-LiClO₄SPEs decrease as the decreasing of the real temperature of the SM400-IPN-LiClO₄SPEs. When the temperature is kept unchanged, LiClO₄ is about 5% of PEG350mA by weight, the ionic conductivities of the IPNs-LiClO₄SPE is the highest. The ionic conductivities of the SM400-IPN-LiClO₄ can reach to $6.06×10^{-5}$ S cm$^{-1}$ at 20 Celsius degrees, and reach to $3.64×10^{-4}$ S cm$^{-1}$ at 80 Celsius degrees.

In addition, under the same condition, the ionic conductivity of IPN-LiClO$_4$SPE can be improved by adding SM400. For example, at about 20 Celsius degrees, LiClO$_4$ is about 5% of PEG350mA by weight, the ionic conductivity of IPN-LiClO$_4$SPE can be improved to $6.06×10^{-5}$ S cm$^{-1}$ from $2.14×10^{-5}$ S cm$^{-1}$ by adding SM400. The reasons can be explained as follow. SM400 can prevent the IPN from being crystallized, and can decrease the crystallization degree of the IPN. Thus, SM400 can improve the ionic conductivities of SPEs. The improvement effect of SM400 on the ionic conductivities of SPEs can decrease with the increase of temperature.

(4) Li$^+$ Transference Number in the Lithium Metal Battery 100

In one embodiment, the Li$^+$ transference number in the lithium metal battery 100 can be measured by a method proposed by Bruce et al. Wherein, Li$^+$ transference number can be calculated by the following formula:

$$t^+ = \frac{I_s(V - I_0 R_0)}{I_0(V - I_s R_s)}$$

Wherein, t$^+$ represents the ion transference number; V represents the constant voltage applied to the lithium metal battery 100; R$_0$ and R$_s$ respectively represents the initial and steady-state resistances of a passivating layer in the lithium metal battery 100; I$_0$ and I$_s$ respectively represents the initial and steady-state currents of the lithium metal battery 100.

Figure 5:
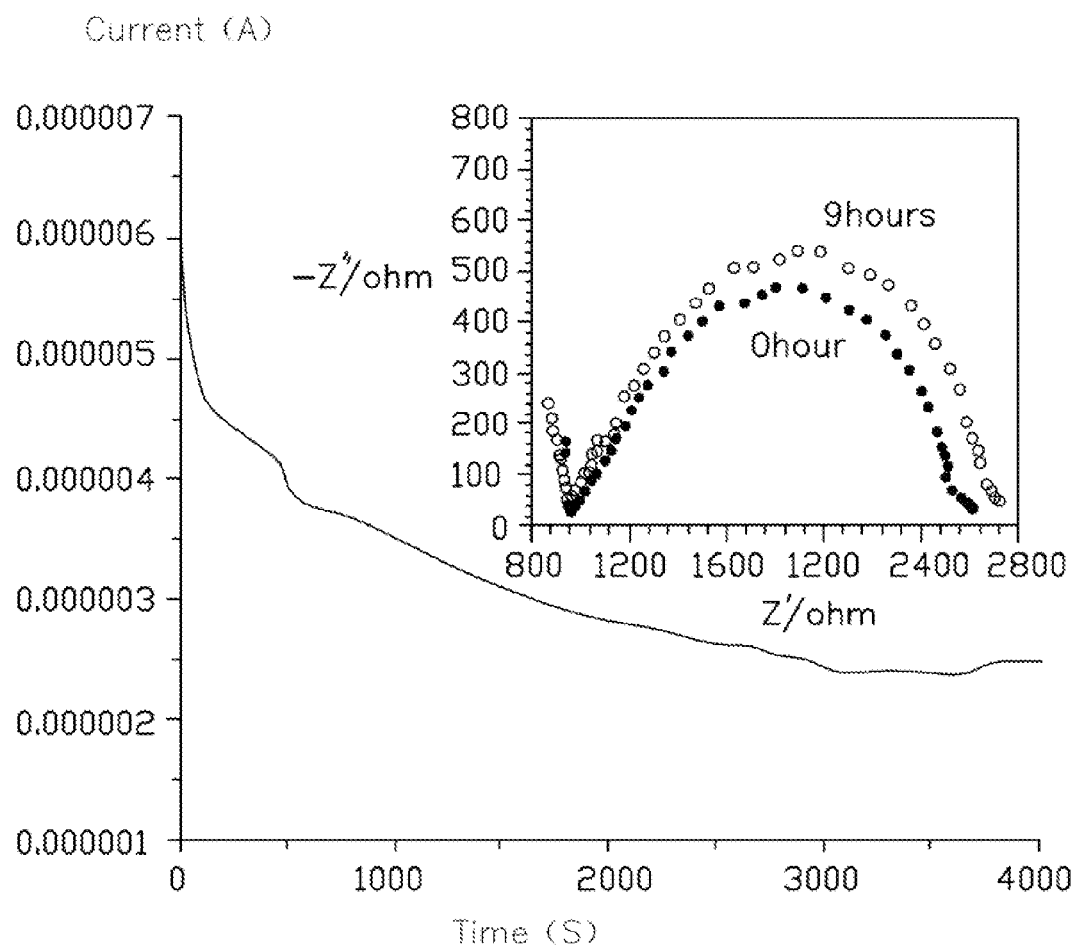
FIG. 5 shows a chronoamperometric curve of the lithium based battery shown in FIG. 1 and alternating current (AC) impedance spectra of the lithium based battery before and after steady state current.

Referring to FIG. 5, in the SM400-IPN-LiClO$_4$SPE 120, LiClO$_4$ is about 5% of PEG350mA by weight. The constant voltage V is about 10 millivolt (mV). The initial current I$_0$ is about $6.254×10^{-6}$ amperes (A). The current response is completely stabilized after about 9 hours. The steady-state current is about $2.5×10^{-6}$ A. The Li$^+$ transference number is about 0.400 calculated by the above expression. Li$^+$ transference number can reach to 0.4 attribute to the mobility of the branched chains of IPN. Li$^+$ transference number can reach to 0.4, which shows that the SM400-IPN-LiClO$_4$SPE can be applied in lithium metal battery 100.

Figure 6:
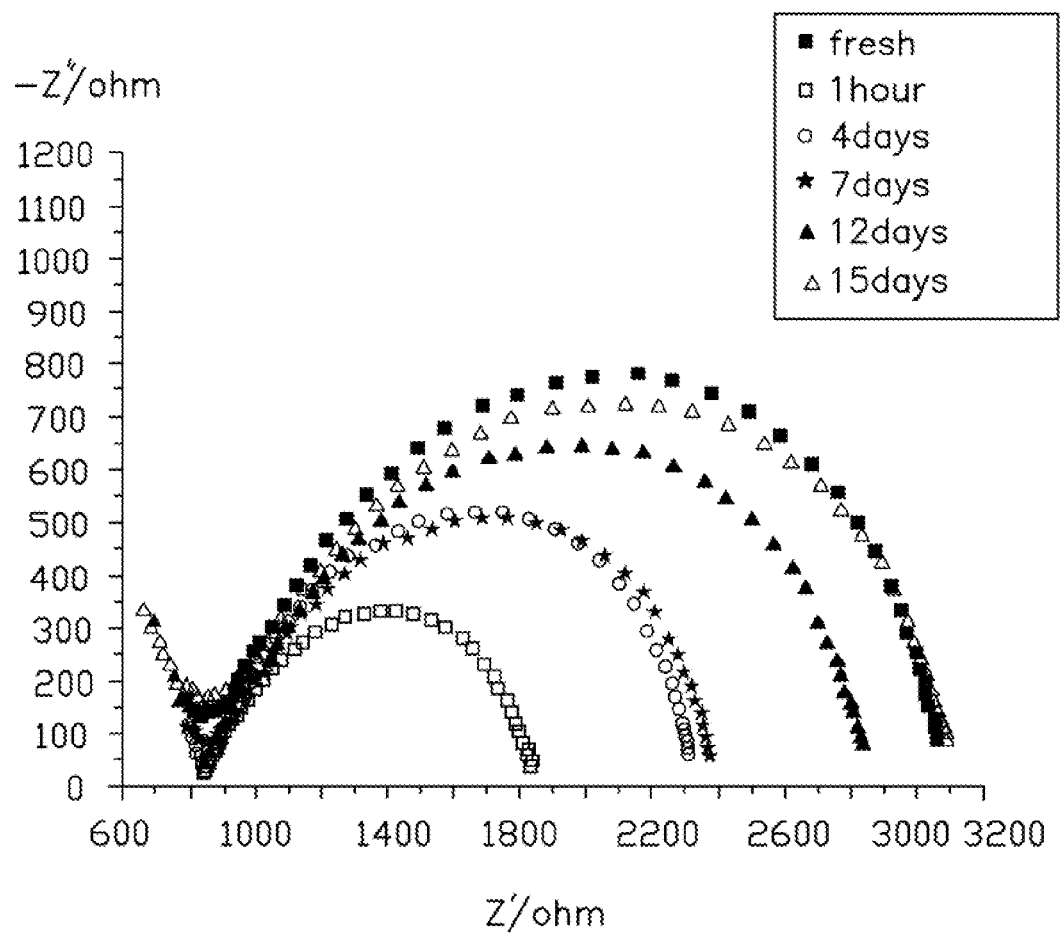
FIG. 6 shows AC impedance spectra of the lithium based battery shown in FIG. 1.

(5) Electrochemical Compatibility of SM400-IPN-LiClO$_4$ SPE with Metal Lithium Electrodes The lithium metal battery 100 using the SM400-IPN-LiClO$_4$SPE can be remarked as Li|(SM400-IPN-LiClO$_4$)|Li. The AC impedance spectra of Li|(SM400-IPN-LiClO$_4$)|Li battery as a function of aging time under open-circuit conditions at room temperature are shown in FIG. 6. Except for the fresh state, there is a progressive expansion of the semicircle in the middle frequency range, and eventually becomes almost stabilized at a constant value of about 2300Ω. The semicircle shows the continuous growth of a resistive layer on a lithium metal surface. The semicircle also indicates that SM400-IPN-LiClO$_4$ is electrochemically stable for lithium metal. Therefore, the SM400-IPN-LiClO$_4$ can be applied in lithium ion batteries, or used in secondary lithium metal batteries.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A solid electrolyte, comprising:
    an interpenetrating polymer network comprising $-(CH_2-CH_2-O-)_n$ segments, the interpenetrating polymer network being formed by polymerizing a first monomer $R_1-O-(CH_2-CH_2-O-)_n R_2$ with a second monomer $R_3-O-(CH_2-CH_2-O-)_m R_4$ under an initiator, wherein each "R$_1$", "R$_2$" and "R$_3$" comprises $-C=C-$ group or $-C\equiv C-$ group; the "R$_4$" is an alkyl group or a hydrogen atom; the "m" and "n" are integers; a molecular weight of the first monomer or a molecular weight of the second monomer is greater than or equal to 100 and less than or equal to 800; the first monomer is less than or equal to 50% of the second monomer by weight; and the lithium salt is less than or equal to 10% of the second monomer by weight;
    a plasticizer dispersed in the interpenetrating polymer network, wherein the plasticizer is a multi-arm macromolecular material; and
    a lithium salt dispersed in the interpenetrating polymer network.

2. The solid electrolyte of claim 1, wherein a molecular structure of the interpenetrating polymer network comprises an open circle structure.

3. The solid electrolyte of claim 1, wherein each "R$_1$", "R$_2$" and "R$_3$" comprises an unsaturated chain hydrocarbon group or an unsaturated chain hydrocarbon group with carbonyl.

4. The solid electrolyte of claim 3, wherein the "R$_1$", "R$_2$" or "R$_3$" is ethenyl ($-CH=CH_2$), ethynyl ($-C\equiv CH$), allyl ($-CH=CH-CH_3$, or $-(CH_3)C=CH_2$), propinyl ($-C\equiv C-CH_3$), or ethenyl ketonic group

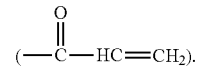

5. The solid electrolyte of claim 1, wherein the molecular weight of the first monomer, or the molecular weight of the second monomer is greater than or equal to 200 and less than or equal to 600.

6. The solid electrolyte of claim 1, wherein the lithium salt is selected from the group consisting of lithium perchlorate, lithium hexafluoro-phosphate, lithium tetrafluoro-borate, lithium bis(oxalate)-borate, lithium manganate, lithium iron phosphate, lithium nickelate, and lithium cobalt oxide.

7. The solid electrolyte of claim 1, wherein the initiator is a photo-initiator selected from the group consisting of 1-hydroxy-cyclohexyl phenyl ketone, 2-methyl-1-[4-(methylthio)-phenyl]-2-morpholino-propiopheno, and dimethylol propionic acid.

8. The solid electrolyte of claim 1, wherein the initiator is a thermo-initiator selected from the group consisting of chloride gas, bromine gas, organic peroxide, and azo initiator.

9. The solid electrolyte of claim 1, wherein the multi-arm macromolecular material is a four-arm macromolecule material or a six-arm macromolecule material.

10. The solid electrolyte of claim 9, wherein the first monomer is polyethyleneglycol (200) dimethacrylate, the second monomer is methoxy polyethylene glycol (350) monoacrylate, the initiator is dimethylol propionic acid, and the lithium salt is lithium perchlorate.

11. The solid electrolyte of claim 10, wherein the plasticizer is a six-arm macromolecule material synthesized from phloroglucinol, phosphorus oxychloride and methy polyethylene glycol.

12. The solid electrolyte of claim 11, wherein the six-arm macromolecule material consists of six-arm macromolecules, and a molecular weight of each six-arm macromolecule is about 120, 400, 600 or 750.

13. A lithium based battery, comprising:
an anode,
a cathode; and
a solid electrolyte located between the anode and the cathode, and the solid electrolyte comprising:
an interpenetrating polymer network comprising $-(CH_2-CH_2-O)_n-$ segments, and the interpenetrating polymer network being formed by polymerizing a first monomer $R_1-O-(CH_2-CH_2-O)_n-R_2$ with a second monomer $R_3-O-(CH_2-CH_2-O)_m-R_4$ under an initiator, wherein the "$R_1$", "$R_2$" or "$R_3$" respectively comprises $-C=C-$ group or $-C\equiv C-$ group; the "$R_4$" comprises an alkyl group or a hydrogen atom; the "m" and "n" are integers; a molecular weight of the first monomer or a molecular weight of the second monomer is greater than or equal to 100, and less than or equal to 800; the first monomer is less than or equal to 50% of the second monomer by weight; the lithium salt is less than or equal to 10% of the second monomer by weight;
a plasticizer dispersed in the interpenetrating polymer network, wherein the plasticizer is a multi-arm macromolecular material; and
a lithium salt dispersed in the interpenetrating polymer network.

14. The lithium based battery of claim 13, wherein the "$R_1$", "$R_2$" or "$R_3$" is an unsaturated chain hydrocarbon group or an unsaturated chain hydrocarbon group with carbonyl.

15. The lithium based battery of claim 13, wherein the "$R_1$", "$R_2$" or "$R_3$" is ethenyl, ethynyl, allyl, propinyl, or ethenyl ketonic group.

16. The lithium based battery of claim 13, wherein the first monomer is polyethyleneglycol (200) dimethacrylate, the second monomer is methoxy polyethylene glycol (350) monoacrylate, the lithium salt is lithium perchlorate, and the initiator is dimethylol propionic acid, and the plasticizer is a six-arm material synthesized from phloroglucinol, phosphorus oxychloride and methy polyethylene glycol.

17. The lithium based battery of claim 16, wherein materials of the anode and the cathode are pure metal lithium or lithium alloy.

18. The lithium based battery of claim 13, wherein the lithium based battery is a lithium metal battery or a lithium ion battery.

* * * * *